US009222445B2

(12) United States Patent
Akiyama et al.

(10) Patent No.: US 9,222,445 B2
(45) Date of Patent: Dec. 29, 2015

(54) FUEL VAPOR PROCESSING APPARATUS

(71) Applicants: AISIAN KOGYO KABUSHIKI KAISHA, Obu-shi, Aichi-ken (JP); TOYOTA JIDOSHA KABUSHIKI KAISHA, Aichi-ken (JP)

(72) Inventors: Takanori Akiyama, Nagoya (JP); Ryuji Kosugi, Obu (JP); Junya Kimoto, Obu (JP); Masakazu Hasegawa, Miyoshi (JP); Shinji Shimokawa, Seto (JP)

(73) Assignees: AISAN KOGYO KABUSHIKI KAISHA, Obu-Shi, Aichi-Ken (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 185 days.

(21) Appl. No.: 14/167,730

(22) Filed: Jan. 29, 2014

(65) Prior Publication Data

US 2014/0209188 A1 Jul. 31, 2014

(30) Foreign Application Priority Data

Jan. 30, 2013 (JP) ................................ 2013-015419

(51) Int. Cl.

*F02M 25/08* (2006.01)
*B01D 53/04* (2006.01)
*B60K 15/035* (2006.01)
*F16K 24/04* (2006.01)

(52) U.S. Cl.

CPC ....... *F02M 25/0854* (2013.01); *B01D 53/0407* (2013.01); *B60K 15/03504* (2013.01); *F02M 25/0872* (2013.01); *F16K 24/04* (2013.01); *B01D 53/0438* (2013.01); *B01D 2259/4516* (2013.01); *Y10T 137/6416* (2015.04); *Y10T 137/86324* (2015.04)

(58) Field of Classification Search

CPC ........... F02M 25/0872; F02M 25/0854; B60K 15/03504; F16K 24/04; B01D 53/0407
USPC ................... 123/519, 516, 518, 520; 137/587
See application file for complete search history.

(56) References Cited

U.S. PATENT DOCUMENTS 5,056,494 A * 10/1991 Kayanuma ......... F02M 25/0872 123/516
7,059,306 B2 * 6/2006 Reddy ................ F02M 25/0836 123/518
7,614,387 B2 * 11/2009 Wang .............. B60K 15/03519 123/519

(Continued)

FOREIGN PATENT DOCUMENTS

JP 0163765 4/1989
JP 04353256 8/1992

(Continued)

*Primary Examiner* — Mahmoud Gimie
(74) *Attorney, Agent, or Firm* — Conley Rose, P.C.

(57) ABSTRACT

A fuel vapor processing apparatus may include a first canister and a second canister each having an adsorbent disposed therein. The second canister may include a first passage and a second passage each communicating between the first canister and an atmosphere. The first passage may be configured as an adsorption passage having the adsorbent disposed therein. The second passage may be configured as an air passage through which air flows. A control device may control flow of the air through the air passage. A heating device may heat the air flowing through the air passage. The air passage may be arranged so that the adsorbent of the adsorption chamber is heated by heat of the air that is heated by the heating device and flows through the air passage.

9 Claims, 7 Drawing Sheets

(56) References Cited

U.S. PATENT DOCUMENTS

2004/0094132 A1 5/2004 Fujimoto et al.
2007/0266851 A1* 11/2007 Fink .................. B01D 53/0407 95/11
2009/0013973 A1* 1/2009 Yamasaki .......... F02M 25/0854 123/519
2011/0214572 A1 9/2011 Hasegawa et al.

FOREIGN PATENT DOCUMENTS

JP 201100202652 10/2011
WO 02064966 8/2002

* cited by examiner

FUEL VAPOR PROCESSING APPARATUS

CROSS-REFERENCE TO RELATED APPLICATIONS

This application claims priority to Japanese patent application serial number 2013-015419, filed on Jan. 30, 2013, the contents of which are incorporated herein by reference in its entirety.

STATEMENT REGARDING FEDERALLY SPONSORED RESEARCH OR DEVELOPMENT

Not applicable.

BACKGROUND

Embodiments of the present disclosure relate to fuel vapor processing apparatus used mainly for vehicles such as automobiles having internal combustion engines mounted thereto.

Known fuel vapor processing apparatuses include a first canister having therein an adsorbent capable of adsorbing fuel vapor generated in a fuel tank of a vehicle and allowing desorption of the adsorbed fuel vapor, and a second canister having therein an adsorbent capable of adsorbing fuel vapor contained in a breakthrough gas discharged from the first canister and allowing desorption of the adsorbed fuel vapor (see, for example, US2011/0214572A1). In the apparatus disclosed in US2011/0214572A1, a partition member allowing passage of gas is arranged inside the second canister, whereby the interior of the second canister is divided into inner and outer passages communicating with each other. The outer passage is used as an adsorption passage in which the adsorbent is arranged, and the inner passage is used an air passage through which air flows. As is known in the art, in a canister using an adsorbent such as activated carbon, when fuel vapor is adsorbed, the adsorption performance of the adsorbent may deteriorate as the temperature of the adsorbent increases due to an exothermic reaction. Conversely, when the adsorbed fuel component is desorbed, the desorption efficiency (i.e., purge performance) of the adsorbent may deteriorate as the temperature of the adsorbent decreases due to an endothermic reaction.

In the known fuel vapor processing apparatus, air (e.g., hot air) heated by adsorption heat generated by the adsorbent of the first canister may pass through the air passage of the second canister during refueling. As a result, the adsorbent in the adsorption passage may be heated. However, the circumference of the adsorption passage is exposed to the outside, so that the heat of the adsorption passage may be dissipated to the outside. Thus, the desorption efficiency of the adsorbent may deteriorate for the next purge operation. This may result in an increase in the residual amount of the fuel component (HC) per pore of the adsorbent of the second canister, resulting in an increase in the blow-through quantity of the fuel component.

Therefore, there has been a need in the art for suppressing dissipation to the outside of the heat in the adsorption passage of the second canister.

BRIEF SUMMARY

A fuel vapor processing apparatus may include a first canister and a second canister each having an adsorbent disposed therein. The second canister may include a first passage and a second passage each communicating between the first canister and an atmosphere. The first passage may be configured as an adsorption passage having the adsorbent disposed therein. The second passage may be configured as an air passage through which air flows. A control device may control flow of the air through the air passage. A heater may heat the air flowing through the air passage. The air passage may be arranged so that the adsorbent of the adsorption chamber is heated by heat of the air that is heated by the heater and flows through the air passage.

DETAILED DESCRIPTION

Figure 1:
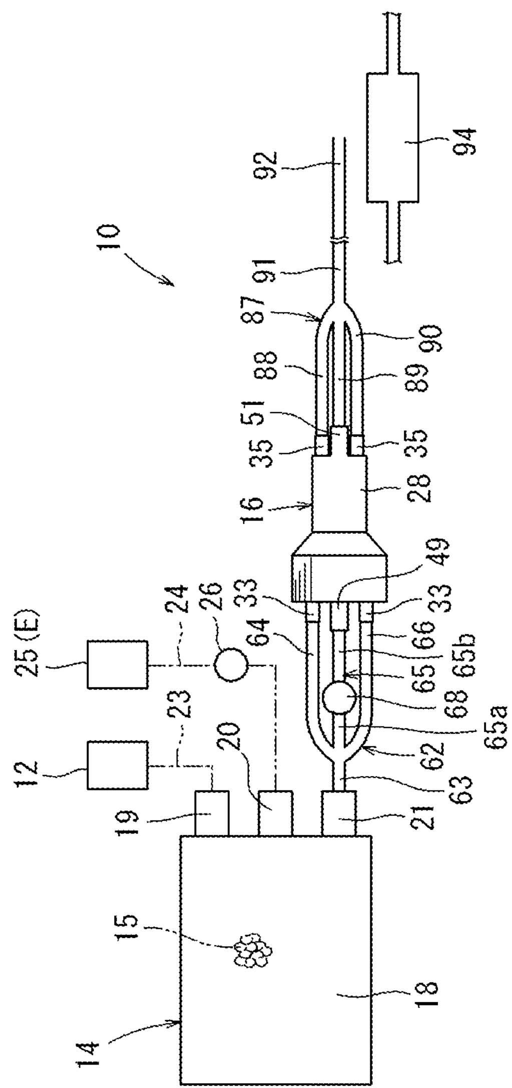
FIG. 1 is a structural diagram of a fuel vapor processing apparatus according to an embodiment.

Each of the additional features and teachings disclosed above and below may be utilized separately or in conjunction with other features and teachings to provide improved fuel vapor processing apparatus. Representative examples, which utilize many of these additional features and teachings both separately and in conjunction with one another, will now be described in detail with reference to the attached drawings. This detailed description is merely intended to teach a person of ordinary skill in the art further details for practicing preferred aspects of the present teachings and is not intended to limit the scope of the disclosure. Only the claims define the scope of the claimed invention. Therefore, combinations of features and steps disclosed in the following detailed description may not be necessary to practice the claimed invention in the broadest sense, and are instead taught merely to particularly describe representative examples. Moreover, various features of the representative examples and the dependent claims may be combined in ways that are not specifically enumerated in order to provide additional useful examples of the present teachings.

In one embodiment, a fuel vapor processing apparatus may include a first canister and a second canister. The first canister has a first adsorbent disposed therein. The first absorbent is capable of adsorbing fuel vapor generated in a vehicle fuel tank and allowing desorption of the adsorbed fuel vapor. The second canister has a second adsorbent disposed therein. The second adsorbent is capable of adsorbing fuel vapor contained in a breakthrough gas discharged from the first canister and allowing desorption of the adsorbed fuel vapor. The second canister may include a first passage and a second passage arranged parallel to each other. Each of the first passage and the second passage may have a first end and a second end opposite to the first end. The first end may communicate with the first canister and the second end may be opened to the atmosphere. The first passage may be configured as an adsorption passage having the second adsorbent disposed therein. The second passage may be configured as an air passage through which air flows. The fuel vapor processing apparatus may further include an opening and closing device disposed at the air passage or a passage communicating with the air passage. The opening and closing device may be configured to close under a regular state and configured to open during refueling. The air passage may include an outer side passage portion surrounding at least a part of the circumference of the adsorption passage. In this specification, the term "regular state" is used to mean either a state where a vehicle's engine is not operating (e.g., when the vehicle is parked) or a state where a purge operation is performed during the operation of the engine.

With this arrangement, in the regular state, the opening and closing device may close to shut off the air passage of the second canister. Therefore, during parking of the vehicle, the breakthrough gas discharged from the first canister may flow through the adsorption passage of the second canister, so that fuel vapor contained in the breakthrough gas may be adsorbed by the second adsorbent of the second canister. On the other hand, during the purge operation, the air (atmospheric air) may flow into the first canister through the second adsorption passage of the second canister, so that the fuel vapor adsorbed by the second adsorbent of the second canister can be desorbed.

During refueling of fuel into the fuel tank, the opening and closing device may be opened, so that the air passage of the second canister may be opened. Therefore, it may be possible to achieve an improvement in terms of the blow-through efficiency of the air flowing through the second canister and to facilitate the refueling operation. In addition, the hot air heated by the adsorption heat generated by the first adsorbent may flow through the outer side passage portion of the air passage of the second canister. Because the outer side passage portion of the air passage surrounds at least a part of the circumference of the adsorption passage, a heat insulation effect between the adsorption passage and the atmosphere may be achieved by the hot air flowing through the outer side passage portion. In this way, it is possible to suppress dissipation of heat of the adsorption passage of the second canister to the atmosphere. It may be also possible to achieve a further improvement in terms of the desorption efficiency of the second adsorbent for the next purge operation. Further, due to the hot air flowing through the outer side passage portion, it is possible to attain the effect of heating the second adsorbent of the adsorption passage from its outer side, so that it is possible to achieve a further improvement in terms of the desorption efficiency of the second adsorbent for the next purge operation. Eventually, it is possible to reduce the residual amount the fuel component (HC) per pore of the second adsorbent of the second canister 16, and to reduce the blow-through amount of the fuel component.

The air passage of the second canister may further include an inner side passage portion extending through inside of the adsorption passage. With this arrangement, during refueling, the hot air discharged from the first canister may also flow through the inner side passage portion. In this way, it is possible to attain the effect of heating the second adsorbent of the adsorption passage from its inner side by the hot air flowing through the inner side passage portion, so that it is possible to achieve a further improvement in terms of the desorption efficiency of the second adsorbent for the next purge operation.

The inner side passage portion may have a first passage area, and the outer side passage portion may have a second passage area smaller than the first passage area. With this arrangement, during refueling, the amount of flow of the hot air supplied from the first canister to the inner side passage portion may be larger than that supplied to the outer side passage portion of the air passage of the second canister. That is, the main purpose of the outer side passage portion of the air passage is to attain the effect of heat insulation between the adsorption passage and the outside. Therefore, the flow rate of the hot air flowing through the outer side passage portion may be reduced, whereas the hot air in an amount corresponding to the reduction may flow through the inner side passage portion of the air passage. As a result, it is possible to enhance the effect of heating the second adsorbent of the adsorption passage from its inner side.

The opening and closing device may be closed if a pressure of air flowing through the air passage is less than a predetermined value. If the pressure of air flowing through the air passage is equal to or more than the predetermined value, the pressure of air may open the opening and closing device. With this arrangement, in the regular state, the opening and closing device may be closed since the pressure of the air discharged from the first canister to the second canister may be less than the predetermined value, i.e., rather low. During refueling, the pressure of the air discharged from the first canister into the air passage of the second canister due to the filled fuel may be not less than the predetermined value, so that the air pressure may open the opening and closing device. Thus, there is no need to control the opening and closing device by an electronic control unit (ECU), making it possible to simplify the construction of the apparatus.

The adsorption passage may include an atmospheric air introduction port opened to the atmosphere. The atmospheric air introduction port may be arranged in a region that is subject to thermal influence of a vehicle engine or an exhaust system of the vehicle engine. With this arrangement, during the purge operation, the warm air of the region under the thermal influence of the vehicle engine or the exhaust system may be introduced into the second canister as the purge air, whereby it is possible to enhance the desorption efficiency of the second adsorbent of the second canister.

In addition or alternatively, the second canister may be arranged in a region that is subject to thermal influence of the vehicle engine or the exhaust system of the vehicle engine. With this arrangement, the second canister may be heated by the heat of the vehicle engine or the exhaust system, whereby it is also possible to enhance the desorption efficiency of the second adsorbent of the second canister.

In the following, various embodiments will be described with reference to the drawings.

An embodiment will be described in connection with a fuel vapor processing apparatus that may be mounted to a vehicle such as an automobile.

Referring to FIG. 1, a fuel vapor processing apparatus 10 may include a main canister 14 and a trap canister 16. An adsorbent 15 may be disposed in the main canister 14. The adsorbent may adsorb fuel vapor generated in a fuel tank 12 of a vehicle (not shown) and may allow desorption of the adsorbed fuel vapor. An adsorbent 45 (see FIG. 2) may be disposed in the trap canister 16. The adsorbent 45 may adsorb fuel vapor contained in a breakthrough gas discharged from the main canister 14 and may allow desorption of the adsorbed fuel vapor. The main canister 14 and the trap canister 16 may be also called a "first canister" and a "second canister", respectively.

The main canister 14 will be described. The main canister 14 may include a main case 18. The interior of the main case 18 is filled with the adsorbent 15 that may be adsorbent granules. Activated carbon may be used as the adsorbent 15. Further, as the activated carbon, it is possible to use, for example, crushed activated carbon (i.e., crushed carbon), or granulated carbon obtained through granulation of granular or powder activated carbon together with suitable binder. The construction of the main canister 14 may be similar to that disclosed in US2011/0214572A1. Therefore, the contents of US2011/0214572A1 are incorporated herein by reference in its entirety.

The main case 18 may have a tank port 19, a purge port 20, and a connection port 21. The tank port 19 may communicate with the interior of the fuel tank 12 (more specifically, a gaseous space in the upper portion of the fuel tank 12) via a fuel vapor passage 23. The fuel vapor generated in the fuel tank 12 may be introduced into the main case 18 from the tank port 19 via the fuel vapor passage 23. The purge port 20 may communicate with an intake passage 25 of a vehicle engine E via a purge passage 24. At a point along the purge passage 24, there is provided a purge control valve 26 that can open and close the purge passage 24. During the operation of the engine, an electronic control unit (ECU) (not shown) may control the degree of opening of the purge control valve 26, whereby a purge control can be performed.

Figure 2:
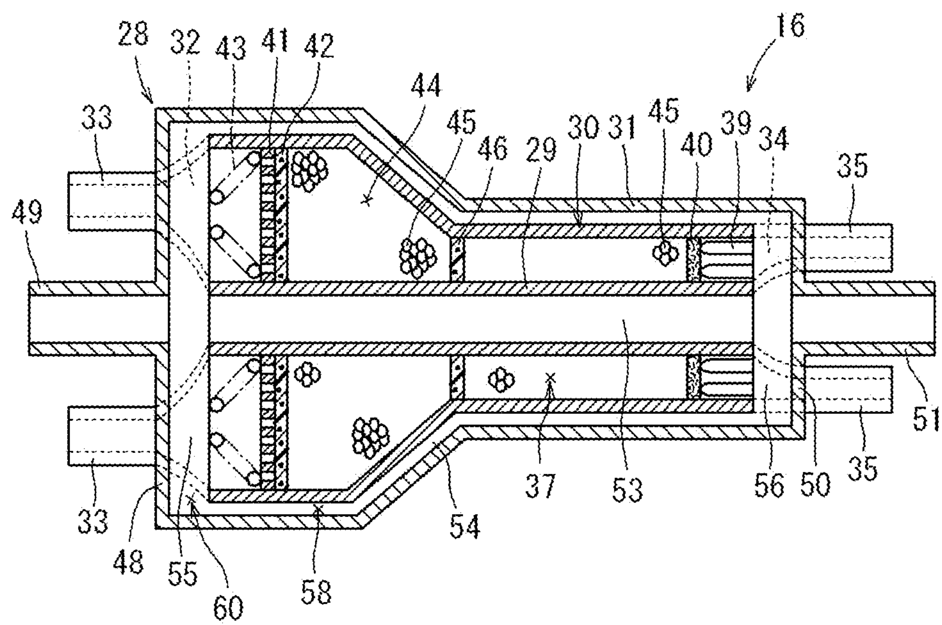
FIG. 2 is a sectional view of a trap canister of the fuel vapor processing apparatus.

Next, the trap canister 16 will be described. FIG. 2 is a sectional view of the trap canister. For the sake of convenience in illustration, the left-hand side in FIG. 2 will be referred to as the front side, and the right-hand side will be referred to as the rear side.

As shown in FIG. 2, the trap canister 16 may include a trap case 28. The trap case 28 may be made of resin and may have a triple-tube structure including an inner tube 29, a middle tube 30, and an outer tube 31. The middle tube 30 may have a stepped cylindrical configuration having a large-diameter front half and a small-diameter rear half. The front end opening formed between the inner tube 29 and the middle tube 30 may be closed by a front inner cover 32 having a shape of an annular plate. The front inner cover 32 may have upper and lower connection ports 33. The rear end opening formed between the inner tube 29 and the middle tube 30 may be closed by a rear inner cover 34 having a shape of an annular plate. The rear inner cover 34 may have upper and lower atmospheric ports 35. A cylindrical adsorption passage 37 may be formed by a space defined between the inner tube 29 and the middle tube 30 and may extend in the axial direction (right and left direction).

A plurality of pin-like protrusions 39 may be formed on the rear inner cover 34 in a dispersed manner so as to protrude into the adsorption passage 37 A filter 40 may be arranged on the front side of the rear inner cover 34. The filter 40 may be formed, for example, of non-woven fabric. A perforated plate 41 may be arranged in the front end portion of the adsorption passage 37. On the rear side of the perforated plate 41, a filter 42 may be arranged so as to overlap with the perforated plate 41. The filter 42 may be formed, for example, of foam urethane. The space in the adsorption passage 37 defined between the filter 40 and the filter 42 may be used as an adsorption chamber 44. A spring member 43 may be interposed between the perforated plate 41 and the front inner cover 32. The spring member 43 may be a coil spring and may urge the perforate plate 41 in the rearward direction (or toward the right as shown in FIG. 2).

The adsorption chamber 44 may be filled with the adsorbent 45. The adsorbent 45 may be a granular adsorbent capable of adsorbing a fuel vapor component such as butane contained in the fuel vapor. Activated carbon may be used as the adsorbent 45. Further, as the activated carbon, it is possible to use, for example, crushed activated carbon (i.e., crushed carbon), or granulated carbon obtained through granulation of granular or powder activated carbon together with a suitable binder. A filter 46 may be arranged in the adsorption chamber 44 at the central portion of the middle tube 30 so as to divide the adsorption chamber 44 into a front portion and a rear portion. The filter 46 may allow passage of gas and may be formed, for example, of foam urethane.

The outer tube 31 may have a configuration similar to the middle tube 30. The front end opening of the outer tube 31 may be closed by a front outer cover 48. The front outer cover 48 may have a connection port 49. The connection port 49 may be arranged so as to have the same axis as the inner tube 29. Further, the two connection ports 33 of the front inner cover 32 are arranged so as to extend through the front outer cover 48. The rear end opening of the outer tube 31 may be closed by a rear outer cover 50. The rear outer cover 50 may have a connection port 51. The connection port 51 may be arranged so as to have the same axis as the inner tube 29. Further, the two atmosphere ports 35 of the rear inner cover 34 may be arranged so as to extend through the rear outer cover 50.

An inner side passage portion 53 may be defined by the inner space of the inner tube 29 and may extend in the axial direction (right and left direction). The inner side passage portion 53 may extend through the adsorption passage 37. Further, a cylindrical outer peripheral side passage portion 54 may be defined by the space between the middle tube 30 and the outer tube 31 and may extend in the axial direction (right and left direction). As a result, the adsorption passage 37 is positioned between the outer peripheral side passage portion 54 and the inner side passage portion 53 so as to extend parallel to these passage portions. Further, a front communication passage portion 55 may be defined by the space between the front inner cover 32 and the front outer cover 48. The front communication passage portion 55 may allow communication between the front end portion of the inner side passage portion 53 and the front end portion of the outer peripheral side passage portion 54 in the radial direction. Further, a rear communication path portion 56 may be defined by the space between the rear inner cover 34 and the rear outer cover 50. The rear communication passage portion 56 may allow communication between the rear end portion of the inner side passage portion 53 and the rear end portion of outer peripheral side passage portion 54 in the radial direction. The outer peripheral side passage portion 54, the front communication passage portion 55, and the rear communication passage portion 56 may form an outer side passage portion 58 that surrounds the entire circumference of the adsorption passage 37. The outer side passage portion 58 and the inner side passage portion 53 may form an air passage 60. The passage area (more specifically, the minimum passage area) of the inner side passage portion 53 may be set to be larger than the path area (more specifically, the minimum passage area) of the outer side passage portion 58. The term "passage area" is used to mean a cross sectional area perpendicular to the direction of flow of gas through each of the passage portions 53 and 58.

As shown in FIG. 1, the main canister 14 and the trap canister 16 may be connected to each other via a connection pipe 62. The connection pipe 62 may have a merging side piping portion 63, and upper, middle, and lower branching-off side piping portions 64, 65, and 66, respectively, communicating with the merging side piping portion 63. The merging side piping portion 63 may be connected to the connection port 21 of the main case 18 of the main canister 14. The upper and lower branching-off side piping portions 64 and 66, respectively, may be respectively connected to the upper and lower connection ports 33 on the front side of the trap case 28 of the trap canister 16. The middle branching-off side piping portion 65 may be connected to the central connection port 49 on the front side of the trap case 28. The middle branching-off side piping portion 65 may serve as a passage communicating with the air passage 60 (see FIG. 2) of the trap canister 16.

Figure 3:
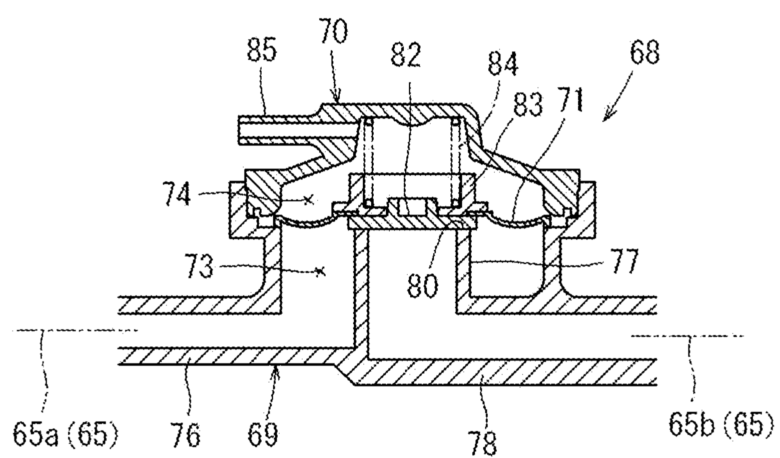
FIG. 3 is a sectional view of a diaphragm valve of the fuel vapor processing apparatus.

A diaphragm valve 68 may be disposed at a point along the middle branching-off side piping portion 65. The middle branching-of side piping portion 65 may be separated into a first side pipe portion 65*a* and a second side pipe portion 65*b*. FIG. 3 is a diagram illustrating the diaphragm valve 68.

As shown in FIG. 3, the diaphragm valve 68 may include a valve case 69, a valve cover 70 closing an opening of the valve case 69, and a diaphragm 71 held between the valve case 69 and the valve cover 70. The diaphragm 71 may be made of an elastic material such as rubber and may have flexibility. The valve case 69 and the valve cover 70 may together define a valve chamber. The valve chamber may be divided by the diaphragm 71 into a pressure regulating chamber 73 on the valve case 69 side and a back pressure chamber 74 on the valve cover 70 side.

An introduction port 76 may be formed at the lower portion of the valve case 69. The first side pipe portion 65*a* of the middle branching-off piping portion 65 may be connected to the introduction port 76. Further, at the lower portion of the valve case 69, there are formed a tubular portion 77 extending upward at the central portion, and a derivation port 78 communicating with the lower end portion of the tubular portion 77. The upper end surface of the tubular portion 77 may be formed as a seat surface 80. The second side pipe portion 65*b* of the middle branching-off side piping portion 65 may be connected to the derivation port 78.

A valve body 82 having a shape of a plate may be arranged on the lower surface side of the central portion of the diaphragm 71. The valve body 82 may face the seat surface 80 of the tubular portion 77. A spring seat 83 may be arranged on the upper surface side of the central portion of the diaphragm 71. A spring 84 may be interposed between the surface of the spring seat 83 and the surface of the valve cover 70 opposed to the surface of the spring seat 83. The spring 84 may be a coil spring and may normally urge the valve body 82 toward the seat surface 80 with a predetermined pressure. Further, the valve cover 70 may have an atmosphere opening port 85, through which the back pressure chamber 74 is opened to the atmosphere. Therefore, the internal pressure of the back chamber 74 may be always equal to the atmospheric pressure.

If the air pressure in the pressure regulating chamber 73 of the diaphragm valve 68 is smaller than the urging force of the spring 84, the diaphragm valve 68 may be closed because the valve body 82 of the diaphragm 71 may be moved to be seated on the seat surface 80 by the urging force of the spring 84. If the air pressure in the pressure regulating chamber 73 is larger than the urging force of the spring 84, the diaphragm valve 68 may be opened because the valve body 82 of the diaphragm 71 may move away from the seat surface 80 against the urging of the spring 84 due to the air pressure. Therefore, the diaphragm valve 68 may be closed if the pressure of the air flowing through the middle branching-off side piping portion 65 of the connection pipe 65 (see FIG. 1) communicating with the air path 60 (See FIG. 2) of the trap canister 16 is less than a predetermined value. The diaphragm valve 68 may be opened if the pressure of the air is equal to or more than the predetermined value. In this way, the diaphragm valve 68 may serve as an opening/closing device or a control device for controlling the flow of air flowing through the middle branching-off side piping portion 65.

As shown in FIG. 1, a pipe member 87 may be connected to the trap canister 16. The pipe member 87 may have upper, middle, and lower connection side piping portions 88, 89, and 90, respectively, and an atmosphere side piping portion 91 communicating with the connection side piping portions 88, 89, and 90. The upper and lower connection side piping portions 88 and 90, respectively, may be respectively connected to the upper and lower atmosphere ports 35 on the rear side of the trap canister 16. The middle connection side piping portion 89 may be connected to the middle connection port 51 on the rear side of the trap canister 16.

The opening side end of the atmosphere side piping portion 91 may be configured as an atmosphere introduction port 92 open to the atmosphere. The atmosphere introduction port 92 may be arranged proximal to the upper side of a muffler 94, which is a largest exhaust heat quantity region among the regions under the thermal influence of the muffler 94 of the vehicle (not shown). The muffler 94 is an example of an exhaust system of the vehicle. The atmosphere introduction port 92 may serve as an atmosphere introduction port of the adsorption passage 37.

Next, the operation of the fuel vapor processing apparatus 10 (see FIG. 1) will be described.

In the regular state, e.g., during parking of the vehicle and during the purge operation, the air discharged from the main canister 14 to the trap canister 16 may be at a low pressure less than a predetermined value, so that the diaphragm valve 68 may be closed. Therefore, the middle branching-off side piping portion 65 of the connection pipe 62 that is the passage communicating with the air passage 60 of the trap canister 16 may be shut off.

Figure 4:
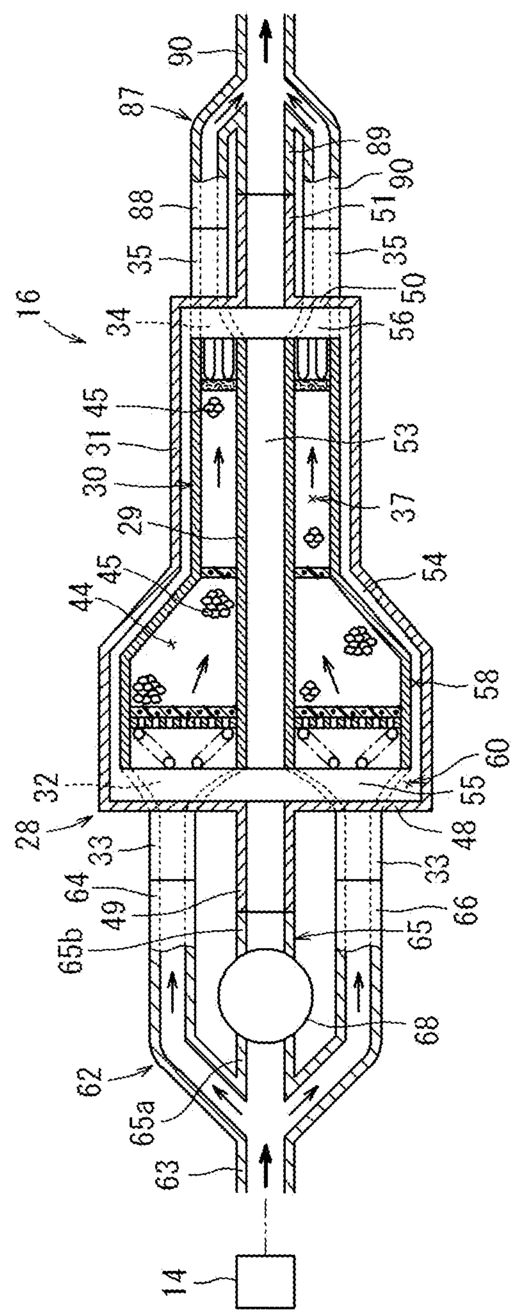
FIG. 4 is an explanatory view illustrating the flow of air in the trap canister during parking of a vehicle.

During parking of the vehicle, the fuel vapor generated in the fuel tank 12 may be introduced into the main canister 14 (more specifically, into the main case 18) via the fuel vapor passage 23 so as to be adsorbed by the adsorbent 15. The breakthrough gas discharged from the main canister 14 may be introduced into the trap canister 16 (more specifically, into the trap case 28) via the connection pipe 62. Because the diaphragm valve 68 may be in the closed state, the breakthrough gas may flow through the adsorption passage 37 of the trap case 28 via the merging side piping portion 63 and the upper and lower branching-off side piping portions 64 and 66 of the connection pipe 62 (see arrows in FIG. 4). As the breakthrough gas flows through the adsorption chamber 44 of the adsorption passage 37, the fuel vapor contained in the breakthrough gas may be adsorbed by the adsorbent 45. The air containing no or little fuel vapor may be discharged into the atmosphere from the atmosphere introduction port 92 via the upper and lower connection side piping portions 88 and 90 and the atmosphere side piping portion 91 of the pipe member 87. In this state, the breakthrough gas may not flow through the air passage 60 of the trap canister 16.

Figure 5:
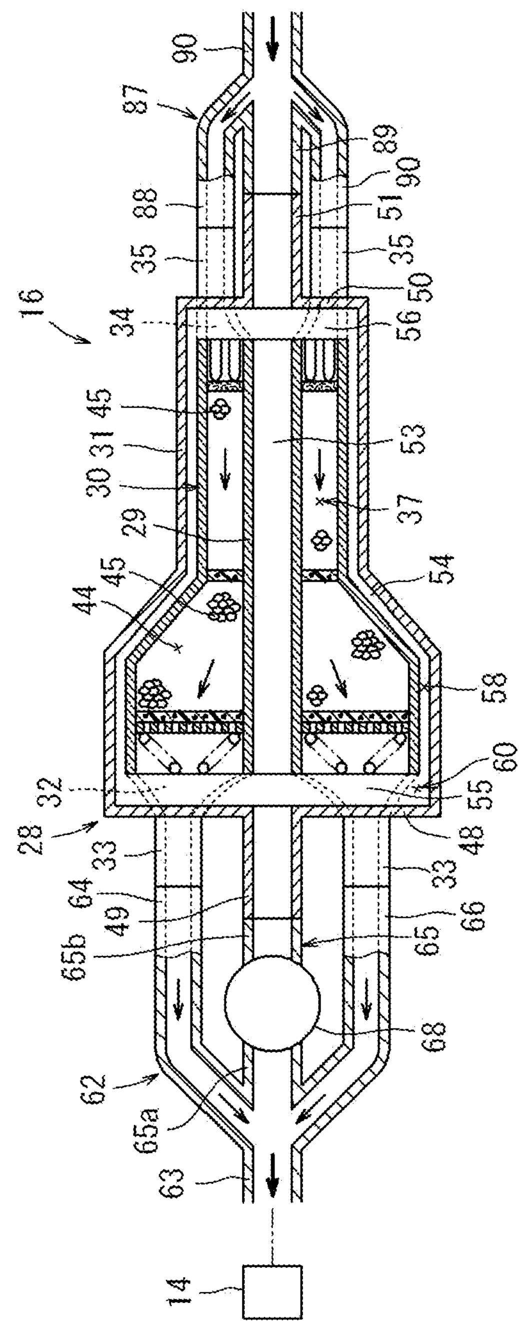
FIG. 5 is an explanatory view illustrating the flow of air in the trap canister during purging.

During purging (more specifically, the purge control operation performed during the operation of the vehicle engine E), the electronic control unit (ECU) may open the purge control valve 26, so that the intake negative pressure of the engine E may be introduced into the main case 18 of the main canister 14, whereby air (external air) may be introduced into the trap canister 16 (more specifically, into the trap case 28) along a path in a direction opposite the direction of the flow of the fuel vapor during parking of the vehicle. Because, the diaphragm valve 68 may be in the closed state, the air may flow through the adsorption passage 37 of the trap case 28 from the atmosphere side piping portion 91 of the pipe member 87 via the upper and lower connection side pipe portions 88 and 90 (see arrows in FIG. 5). As the air flows through the adsorption chamber 44 of the adsorption passage 37, the fuel vapor may be desorbed from the adsorbent 45. In this state, no air may flow through the air passage 60 of the trap canister 16.

Because the atmosphere introduction port 92 of the atmosphere side piping portion 91 of the pipe member 87 (see FIG. 1) is arranged in a region under the thermal influence of the muffler 94 of the vehicle, the warm air under the thermal influence of the exhaust system of the vehicle may be introduced as purge air into the adsorption passage 37 of the trap case 28. In this way, the muffler 94 may serve as a heating device for heating the purge air. As a result, the desorption efficiency of the adsorbent 45 may be improved.

A gas containing fuel vapor may flow from the trap case 28 to pass through the main canister 14 (more specifically, through the main case 18) via the connection pipe 62, whereby, after desorption of the fuel vapor also from the adsorbent 15 in the main canister 14, the gas may be purged into the intake passage 25 of the engine E via the purge passage 24.

During refueling, the fuel vapor pushed out of the fuel tank 12 by the filled fuel may be introduced into the main canister 14 (more specifically, into the main case 18) via the fuel vapor passage 23 so as to be adsorbed by the adsorbent 15. The refueling operation may be normally made after the operation of the engine, that is, after the purge operation. Therefore, the fuel vapor from the fuel tank 12 may be sufficiently adsorbed by the adsorbent 15 in the main canister 14. Accordingly, air containing substantially no fuel vapor may be discharged from the main canister 14.

Figure 6:
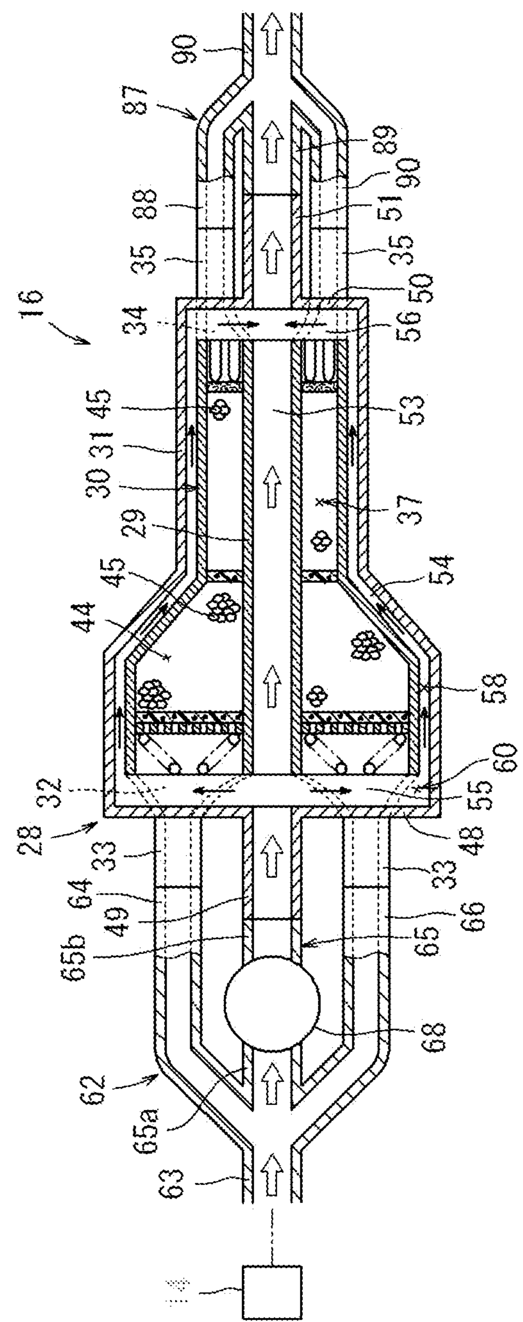
FIG. 6 is an explanatory view illustrating the flow of air in the trap canister during refueling.

The air discharged from the main canister 14 may be the hot air heated by the adsorption heat generated by the adsorbent 15 of the main canister 14. The hot air discharged from the main canister 14 may be introduced into the trap canister 16 (more specifically, into the trap case 28). In this state, the hot air may tend to flow to the adsorption passage 37 and the air passage 60 via the merging side piping portion 63 and the branching-off side piping portions 64, 65, and 66 of the connection pipe 62. However, due to the flow resistance of the adsorbent 45 of the trap canister 16, it may be difficult for the hot air to flow to the upper and lower branching-off side piping portions 64 and 66. Further, due to refueling, the pressure of the air discharged from the main canister 14 into the air passage 60 of the trap canister 16 may be equal to or more than the predetermined value, so that the diaphragm valve 68 may be opened by the air pressure. Therefore, the middle branching-off side piping portion 65 of the connection pipe 62 communicating with the air passage 60 of the trap canister 16 may be opened. Accordingly, the hot air may flow into the air passage 60 (see arrows in FIG. 6). Further, due to the opening of the diaphragm valve 68, it is possible to achieve an improvement in terms of the blow-through efficiency of the air flowing through the trap canister 16 and to facilitate the refueling operation.

The hot air flowing through the air passage 60 of the trap case 28 may be branched to flow into the inner side passage portion 53 and the outer side passage portion 58 (front side communication passage portion 55, the outer peripheral side passage portion 54, and the rear side communication passage portion 56) of the air passage 60 and may thereafter flow through the passage portions 53 and 58. The adsorbent 45 contained in the adsorption passage 37 may be heated from the inner side of the adsorption passage 37 by the hot air flowing through the inner side passage portion 53. Further, due to the hot air flowing through the outer side passage portion 58, it is possible to attain a heat insulating effect between the adsorption passage 37 and the outside. As a result, it is possible to suppress dissipation to the outside of the heat of the adsorption passage 37 of the trap canister 16. Further, the adsorbent 45 contained in the adsorption passage 37 may be heated from the outer side of the adsorption passage 37 by the hot air flowing through the outer side passage portion 58.

The hot air having passed through the passage portion 53 of the air passage 60 and the hot air having passed through the passage portion 58 of the air passage 60 may be merged to flow through the middle connection side piping portion 89 and the atmosphere side piping portion 91 of the pipe member 87 before being discharged into the atmosphere from the atmosphere introduction port 92. If the refueling operation is stopped, the pressure of the air discharged from the main canister 14 into the trap canister 16 may be lowered to become less than the predetermined value, so that the diaphragm valve 68 may be closed.

With the fuel vapor processing apparatus 10 described above, during refueling, the air passage 60 of the trap canister 16 may be opened due to opening of the diaphragm valve 68. As a result, it is possible to achieve an improvement in terms of blow-through efficiency of air and to facilitate the refueling operation. In addition, the air (hot air) heated by the adsorption heat generated by the adsorbent 15 of the main canister 14 may flow through the outer side passage portion 58 of the air passage 60 of the trap canister 16. Because the outer side passage portion 58 is formed so as to surround the entire circumference of the adsorption passage 37, it is possible to attain a heat insulating effect between the adsorption passage 37 and the outside by the hot air flowing through the outer side passage portion 58. As a result, it is possible to suppress dissipation to the outside of the heat of the adsorption passage 37 of the trap canister 16, making it possible to achieve an improvement in terms of the desorption efficiency of the adsorbent 45 for the next purge operation. Further, due to the hot air flowing through the outer side passage portion 58, it is possible to attain the effect of heating the adsorbent 45 of the adsorption passage 37 from its outer side, so that it is possible to achieve a further improvement in terms of the desorption efficiency of the adsorbent 45 for the next purge operation. Eventually, it is possible to reduce the residual amount the fuel component (HC) per pore of the adsorbent 45 of the trap canister 16, and to reduce the blow-through amount of the fuel component.

Further, during refueling, the hot air may flow from the main canister 14 into the inner side passage portion 53 of the air passage 60 of the trap canister 16. As a result, it is possible to attain the effect of heating the adsorbent 45 of the adsorption passage 37 from its inner side due to the hot air flowing through the inner side passage portion 53, so that it is possible to achieve an improvement in terms of the desorption efficiency of the adsorbent 45 for the next purge operation.

Further, by setting the passage area of the inner side passage portion 53 of the air passage 60 of the trap canister 16 to be larger than the passage area of the outer side passage portion 58, during refueling, the amount of flow of the hot air supplied from the main canister 14 to the inner side passage portion 53 may be larger than that supplied to the outer side passage portion 58 of the air passage 60 of the trap canister 16. That is, the main purpose of the outer side passage portion 58 of the air passage 60 is to attain the effect of heat insulation between the adsorption passage 37 and the outside. Therefore, the flow rate of the hot air flowing through the outer side passage portion 58 may be reduced, whereas the hot air in an amount corresponding to the reduction may flow through the inner side passage portion 53 of the air passage 60. As a result, it is possible to enhance the effect of heating the adsorbent 45 of the adsorption passage 37 from its inner side.

Further, the diaphragm valve 68 of the trap canister 16 may be closed if the pressure of the air flowing through the air passage 60 is less than the predetermined value, and the diaphragm valve 68 may be opened by the air pressure if the air pressure is equal to or more than the predetermined value. Thus, in the regular state, the diaphragm valve 68 may be closed since the pressure of the air discharged from the main canister 14 to the trap canister 16 may be less than the predetermined value, i.e., rather low. During refueling, the pressure of the air discharged from the main canister 14 into the air passage 60 of the trap canister 16 due to the filled fuel may be equal to or more than the predetermined value, so that the diaphragm valve 68 may be opened by the air pressure. Thus, there is no need to control the diaphragm valve 68 by the electronic control unit (ECU), making it possible to simplify the construction of the apparatus.

Further, the atmosphere introduction port 92 of the atmosphere side piping portion 91 of the pipe member 87 serving as the atmosphere introduction port of the adsorption passage 37 of the trap canister 16 may be arranged in a region under the thermal influence of the vehicle muffler 94. Therefore, during the purge operation, the warm air of the region under the thermal influence of the vehicle muffler 94 may be introduced into the trap canister 16 as the purge air, whereby it is possible to enhance the desorption efficiency of the adsorbent 45 of the trap canister 16. Instead of the region proximal to the upper side of the muffler 94, the atmosphere introduction port 92 may be arranged in a region proximal to the lower side, the left-hand side, or the right-hand side of the muffler 94.

Figure 7:
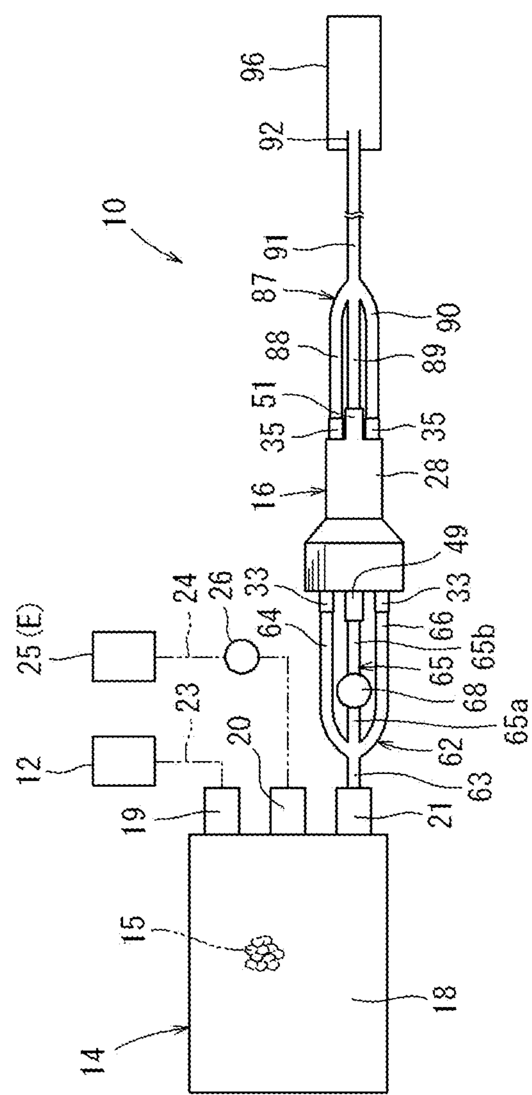
FIG. 7 is a structural diagram of a fuel vapor processing apparatus according to an embodiment.
Figure 8:
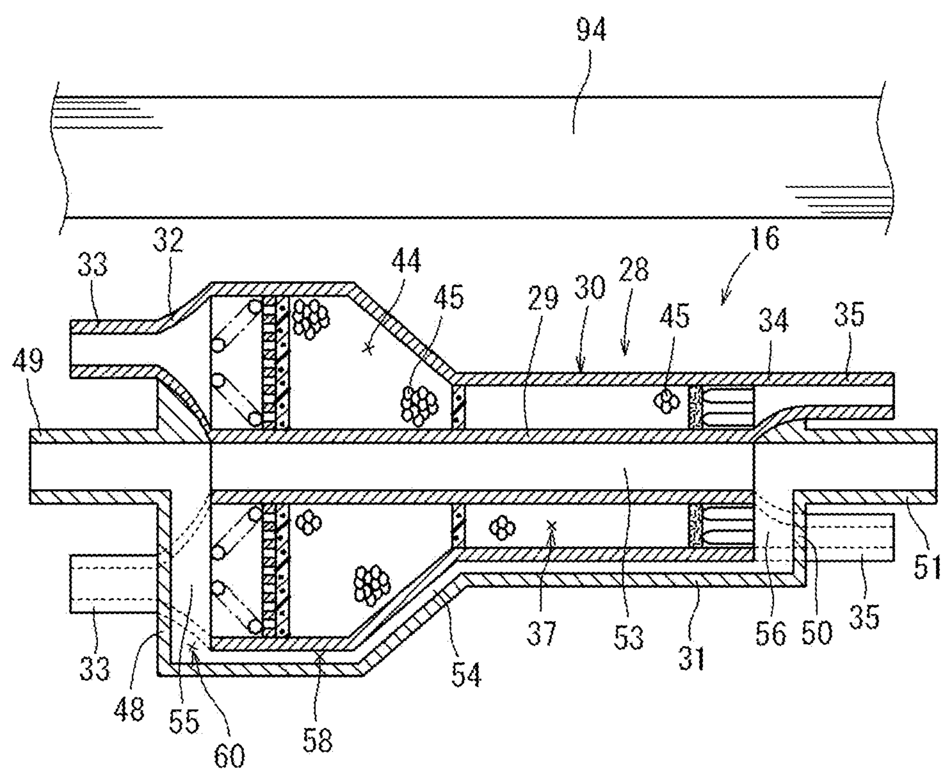
FIG. 8 is a sectional view of a trap canister according to an embodiment.

Other embodiments will now be described with reference to FIGS. 7 and 8. These embodiments are modifications of the embodiment shown in Figs .1-6. Therefore, in FIGS. 7 and 8, like members are given the same reference numeral as the embodiment of FIGS. 1-6, and the description of these members will not be repeated.

An embodiment will now be described with reference to FIG. 7. As shown in FIG. 7, in this embodiment, instead of being arranged in the region under the thermal influence of the muffler 94 of the vehicle (not shown) as in the embodiment of FIG. 1, the atmosphere introduction port 92 of the atmosphere side piping portion 91 of the pipe member 87 is arranged in an engine room (engine compartment) 96 as the region under the thermal influence of the vehicle engine. Also, in this case the atmosphere introduction port 92 of the atmosphere side piping portion 91 may be arranged in a region of the engine room 96 proximal to the exhaust side of the engine, which is a largest exhaust heat quantity region among the regions under the thermal influence of the engine room 96.

An embodiment will now be described with reference to FIG. 8. As shown in FIG. 8, in this embodiment, the trap canister 16 is arranged in a region proximal to the lower side of the muffler 94, which is a largest exhaust heat quantity region among the regions under the thermal influence of the muffler 94 of the vehicle (not shown). The outer tube 31, the front outer cover 48, and the rear outer cover 50 of the trap case 28 are formed so that substantially upper half of the outer side passage portion 58 of the air passage 60 is removed. In addition, substantially upper half of each of the front inner cover 32 and the rear inner cover 34 is exposed to the outside. In this way, the outer side passage portion 58 is formed so as to surround a part of the circumference of the adsorption passage 37. Therefore, the upper half of the adsorption passage 37 may be subject to the thermal influence of the muffler 94. As a result, it is possible to enhance the desorption efficiency of the adsorbent 45 of the trap canister 16.

It may be also possible to arrange the trap canister 16 in a region proximal to the upper side of the muffler 94. In this case, it may be preferable that the vertical orientation of the trap canister 16 is reversed so that the exposed portions of the inner tube 29, the front inner cover 32, and the rear inner cover 34 of the trap case 28 may face the muffler 94. Instead of the region proximal to the lower side or the upper side of the muffler 94, the trap canister 16 may be arranged in a region proximal to the left-hand side or the right-hand side of the muffler 94. In this case, it may be also preferable that the trap canister 16 is arranged such that the exposed portions of the inner tube 29, the front inner cover 32, and the rear inner cover 34 of the trap case 28 face the muffler 94. It is also possible for the trap canister 16 to be arranged in the engine room as the region under the thermal influence of the vehicle engine. Alternatively, the trap canister 16 may be arranged in the engine room (engine compartment) 96, which is the region under the thermal influence of the engine room. Also in this case, it may be preferable that the trap canister 16 is arranged in a region of the engine room 96 proximal to the exhaust side, which is a largest exhaust heat quantity region among the regions under the thermal influence of the engine room. The trap canister 16 of the embodiment of FIG. 8 may be replaced with the trap canister 16 of the embodiment of FIG. 2.

The above embodiments may be modified in various ways. For example, the configuration, arrangement mode, etc. of the adsorption passage 37 and/or the air passage 60 can be modified as appropriate. Further, the inner side passage portion 53 of the air passage 60 may be omitted. Further, the adsorbent 45 of the trap canister 16 is not limited to granular activated carbon. Any other type of adsorbent may be used as long as it can adsorb fuel vapor and allow desorption of the adsorbed fuel vapor. Further, the opening and closing device serving as the control device may also be arranged at the connection port 49 of the trap case 28 instead of being arranged in the middle branching-off side piping portion 65 of the connection pipe 62 communicating with the air passage 60. Further, the opening and closing device may also be arranged in each of the inner side passage portion 53 and the outer side passage portion 58 of the air passage 60. Further, any other type of opening and closing device than the diaphragm valve may be used as long as it can be opened if the pressure of the air flowing through the air passage is less than a predetermined value, and it can be closed if the pressure of the air is equal to or more than the predetermined value. Further, as the opening and closing device, it is also possible to use an electromagnetic valve or the like controlled by the electric control unit (ECU) for closing under the regular state and for opening during filling of fuel. Further, as the opening and closing device, it is also possible to employ a switching device that can switch between the adsorption passage 37 and the air passage 60. Further, the number of the connection ports 33 of the front inner cover 32 and/or the number of the atmospheric ports 35 of the rear inner cover 34 of the trap case 28 of the trap canister 16 may not be limited to two. The number of the connection port 49 of the front outer cover 48 and/or the number of the connection port 51 of the rear outer cover 50 may not be limited to one.

What is claimed is:

1. A fuel vapor processing apparatus comprising:

a first canister having a first adsorbent disposed therein, the first absorbent being capable of adsorbing fuel vapor generated in a vehicle fuel tank and allowing desorption of the adsorbed fuel vapor;

a second canister having a second adsorbent disposed therein, the second adsorbent being capable of adsorbing fuel vapor contained in a breakthrough gas discharged from the first canister and allowing desorption of the adsorbed fuel vapor, wherein the second canister comprises a first passage and a second passage arranged parallel to each other, each of the first passage and the second passage having a first end and a second end opposite to the first end, the first end of each of the first passage and the second passage communicating with the first canister and the second end of each of the first passage and the second passage being opened to an atmosphere;

wherein the first passage is configured as an adsorption passage having the second adsorbent disposed therein, and wherein the second passage is configured as an air passage through which air flows;

an opening and closing device disposed at the second passage or a passage communicating with the second passage, the opening and closing device being configured to close in a regular state and to open during refueling of fuel into the fuel tank; and wherein the second passage includes an outer side passage portion surrounding at least a part of a circumference of the first passage.

2. The fuel vapor processing apparatus according to claim 1, wherein the second passage of the second canister further includes an inner side passage portion extending through inside of the first passage.

3. The fuel vapor processing apparatus according to claim 2, wherein the outer side passage portion has a first passage area, and the inner side passage portion has a second passage area larger than the first passage area.

4. The fuel vapor processing apparatus according to claim 1, wherein:

the opening and closing device is closed if a pressure of air flowing through the second passage is less than a predetermined value, and the opening and closing device is opened by the pressure of air if the pressure of air flowing through the second passage is equal to or more than the predetermined value.

5. The fuel vapor processing apparatus according to claim 1, wherein:

the first passage includes an atmospheric air introduction port opened to the atmosphere; and the atmospheric air introduction port is arranged in a region that is subject to thermal influence of a vehicle engine or an exhaust system of the vehicle engine.

6. The fuel vapor processing apparatus according to claim 1, wherein:

the second canister is arranged in a region that is subject to thermal influence of a vehicle engine or an exhaust system of the vehicle engine.

7. A fuel vapor processing apparatus comprising:

a first canister having a first adsorbent disposed therein, the first absorbent being capable of adsorbing fuel vapor generated in a vehicle fuel tank and allowing desorption of the adsorbed fuel vapor;

a second canister having a second adsorbent disposed therein, the second adsorbent being capable of adsorbing fuel vapor contained in a breakthrough gas discharged from the first canister and allowing desorption of the adsorbed fuel vapor, wherein the second canister comprises a first passage and a second passage each communicating between the first canister and an atmosphere;

wherein the first passage is configured as an adsorption passage having the second adsorbent disposed therein, and wherein the second passage is configured as an air passage through which air flows;

a control device configured to control flow of the air through the second passage;

a heating device configured to heat the air flowing through the second passage;

wherein the second passage is arranged so that the second adsorbent of the adsorption chamber is heated by heat of the air heated by the heating device and flowing through the second passage.

8. The fuel vapor processing apparatus according to claim 7, wherein:

the control device is configured to prevent flow of air through the second passage if a pressure of air flowing through the second passage is less than a predetermined value, and the control device is configured to permit flow of air through the second passage if the pressure of air flowing through the second passage is equal to or more than the predetermined value.

9. The fuel vapor processing apparatus according to claim 7, wherein the heating device comprises a muffler of the vehicle.

* * * * *